United States Patent
Hoppe et al.

(10) Patent No.: US 6,896,752 B1
(45) Date of Patent: May 24, 2005

(54) METHOD FOR PRODUCING COMPACTED FREE-FLOWING RAW MATERIALS FOR VARNISH

(75) Inventors: Lutz Hoppe, Walsrode (DE); Martin Lohrie, Walsrode (DE); Lutz Riechardt, Walsrode (DE); Holger Tanneberger, Fallingbostel (DE)

(73) Assignee: Wolf Walsrode AG, Walsrode (DE)

( * ) Notice: Subject to any disclaimer, the term of this patent is extended or adjusted under 35 U.S.C. 154(b) by 0 days.

(21) Appl. No.: 09/914,436

(22) PCT Filed: Feb. 23, 2000

(86) PCT No.: PCT/EP00/01481

§ 371 (c)(1),
(2), (4) Date: Aug. 27, 2001

(87) PCT Pub. No.: WO00/52058

PCT Pub. Date: Sep. 8, 2000

(30) Foreign Application Priority Data

Mar. 3, 1999 (DE) .......................................... 199 09 230

(51) Int. Cl.[7] .............................................. C06B 21/00
(52) U.S. Cl. ...................... 149/96; 149/109.6; 264/3.4; 264/142; 264/143; 264/148
(58) Field of Search ........................ 264/3.4, 140, 142, 264/143, 148, 163; 149/96, 109.6

(56) References Cited

U.S. PATENT DOCUMENTS

| | | | | |
|---|---|---|---|---|
| 1,978,070 A | * | 10/1934 | Foster | ......................... 149/100 |
| 2,692,087 A | * | 10/1954 | Hartshorn | ................. 241/278.2 |
| 2,853,244 A | * | 9/1958 | Plimpton | ..................... 241/135 |
| 3,057,012 A | * | 10/1962 | Lufkin | ........................ 264/140 |
| 3,756,519 A | * | 9/1973 | Reynolds et al. | .............. 241/73 |
| 3,897,733 A | * | 8/1975 | Stiefel et al. | ............... 102/292 |
| 4,120,920 A | * | 10/1978 | Cougoul et al. | ............. 264/3.3 |
| 4,590,019 A | * | 5/1986 | Luhmann et al. | ............ 264/3.4 |
| 5,254,161 A | * | 10/1993 | DeVido et al. | .......... 106/169.1 |
| 5,378,826 A | | 1/1995 | Hoppe et al. | .................. 536/35 |
| 5,399,297 A | * | 3/1995 | Panthal et al. | .............. 510/451 |
| 5,487,851 A | * | 1/1996 | Dillehay et al. | ............. 264/3.3 |
| 5,565,150 A | * | 10/1996 | Dillehay et al. | ............. 264/3.3 |

FOREIGN PATENT DOCUMENTS

| | | |
|---|---|---|
| EP | 0 084 153 | 7/1983 |
| EP | 0 137 357 | 4/1985 |
| GB | 871299 | 6/1961 |

* cited by examiner

Primary Examiner—Mark Eashoo
(74) Attorney, Agent, or Firm—Joesph C. Gil; James R. Franks

(57) ABSTRACT

A process for producing compacted free-flowing nitrocellulose based lacquer raw materials is described. The process involves pressing a nitrocellulose based lacquer feed material, which is moistened with alcohol or water, through the holes of a die. The pressing step may be performed by means of at least one circulating breaker. The process optionally comprises shearing off the compacted lacquer raw material into pieces of selected length, below the die. The compacted nitrocellulose based lacquer raw materials prepared by the process of the present invention are free flowing and have a moisture content of at least 25%.

9 Claims, 1 Drawing Sheet

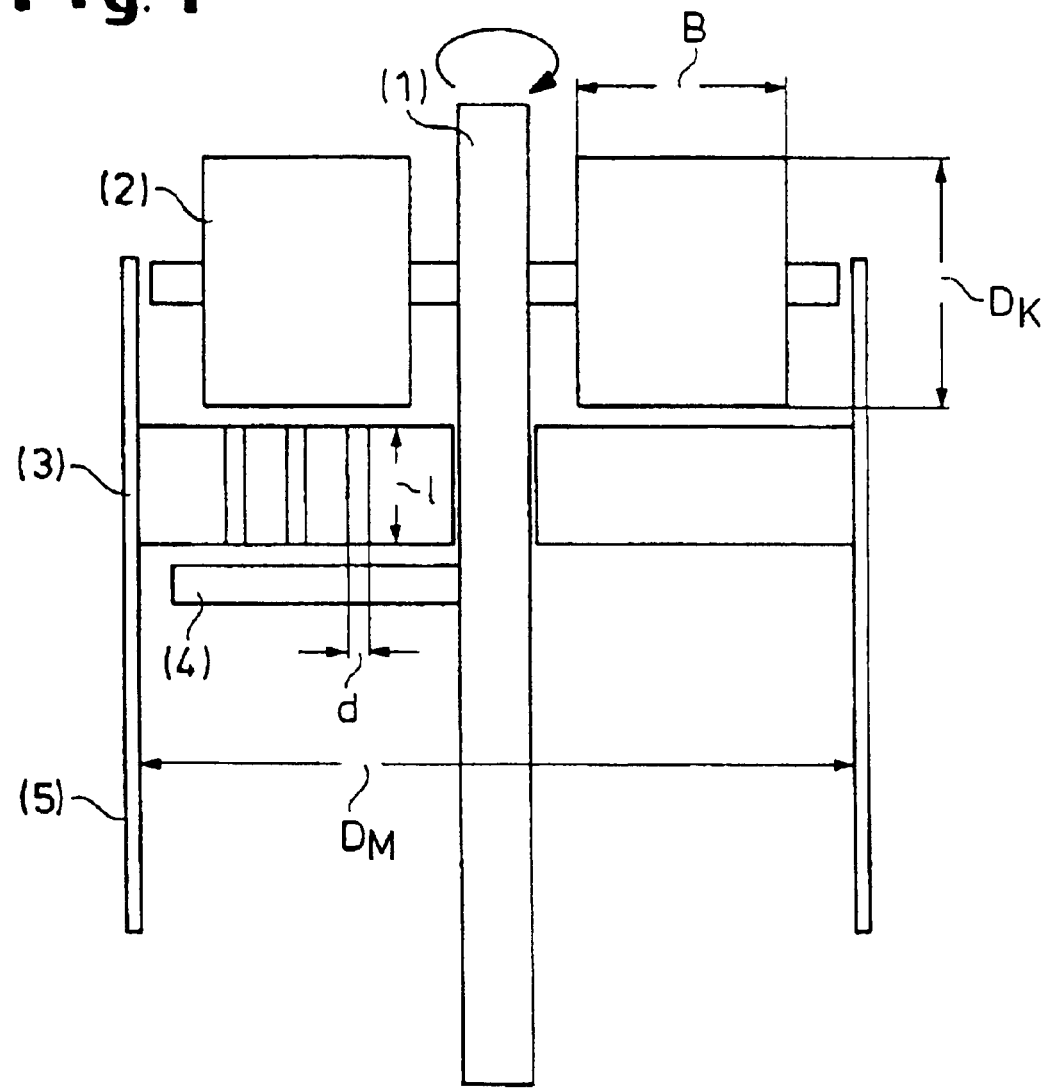

METHOD FOR PRODUCING COMPACTED FREE-FLOWING RAW MATERIALS FOR VARNISH

CROSS REFERENCE TO RELATED PATENT APPLICATIONS

The present patent application claims the right of priority under 35 U.S.C. 119 and 35 U.S.C. 365 of International Application No. PCT/EP00/01481, filed 23 Feb. 2000, which was published in German as International Patent Publication No. WO 00/52058 on 8 Sep. 2000, which is entitled to the right of priority of German Patent Application No. 199 09 230.3, filed 3 Mar. 1999.

FIELD OF THE INVENTION

The present invention relates to a process for producing compacted free-flowing nitrocellulose, which is moistened with water or alcohol, by pressing it through a plate provided with holes.

BACKGROUND OF THE INVENTION

Nitrocellulose materials which have a low degree of esterification and a nitrogen content of up to 12.6%, and which are mainly used in the lacquer industry, are produced by the esterification of cellulose materials with nitrating acids, which usually consist of a mixture of nitric acid, sulphuric acid and water.

After the nitrating acid has been removed, generally by intensive washing with water, and after the desired molecular weight of the nitrocellulose has been obtained by a thermal decomposition process, the nitrocellulose which is thus obtained, and which has a fibrous structure, has to be stabilised to prevent self-ignition. Various stabilising agents are used for this purpose.

Apart from the incorporation of plasticisers by admixture, the most commonly used method is the moistening of the nitrocellulose with alcohols and/or water. The nitrocellulose materials are usually sold with a moisture content of alcohols (such as ethanol, isopropanol or butanol for example) and/or water of 30 or 35%, respectively. If the degree of moistening is less than 25%, these partially esterified nitrocellulose materials have to be treated as "explosive substances" due to their increased hazard potential (Recommendations on the Transport of Dangerous Goods, 10th Edition, United Nations (1997)).

Due to their wool-like structure, fibrous nitrocellulose materials have apparent densities which range between 250 and 350 g/l on average. With regard to the shipping of products such as these, their low apparent density has a disadvantageous effect on packing and shipping costs. This is countered by tamping the fibrous nitrocellulose into the packaging container, such as a drum or carton for example.

Although the apparent density is in fact increased in this manner, the pourability of the nitrocellulose is at the same time reduced. This results in an increased labour requirement for emptying the nitrocellulose container.

A process for treating fibrous nitrocellulose materials is known, the object of which is to make them safer for transport and storage (GB-B-871 299). Compaction is effected by exerting a compressive force $P=2M+6400$ on the moist, fibrous nitrocellulose, where P is the force in pounds per square inch and M is the mean fibre length of the nitrocellulose in microns. The force, which preferably ranges between 15,000 and 17,000 psi (1110–1196 Kp/cm$^2$), is applied by two rolls which are driven in counter-rotation without a separation.

The flake-like nitrocellulose which is thus obtained subsequently has to be broken into smaller pieces in a processing unit. Apart from its high capital and operating costs, one considerable disadvantage of this process is the drying out of the nitrocellulose which occurs during roll compaction. In GB PS 871 299, all the compacted nitrocellulose materials which are obtained according to the examples have a moisture content less than 25%, and are consequently explosive substances. It has been shown in practice that roll compaction under the action of high pressures results in self-ignition phenomena which constitute a hazard for personnel and for the plant, particularly since there is always a very large amount of nitrocellulose in the roll gap.

A similar process principle is described in U.S. Pat. No. 5,378,826. The aforementioned disadvantages are also applicable there.

SUMMARY OF THE INVENTION

The object of the present invention was therefore to provide a new process for producing compacted, free-flowing nitrocellulose which prevents the nitrocellulose from drying out.

It has now surprisingly been found that compacted nitrocellulose can also be obtained by causing the circulating breakers (or oscillating wheels) in a breaker mill, which breakers travel on a die (plate) which is provided with holes, to press the moistened nitrocellulose through the holes (e.g. bores) in the die (see FIG. 1). The nitrocellulose lacquer raw material is thereby compacted. Underneath the die there is a shearing-off apparatus by means of which the granule-like preforms are brought to the desired length. The cross-sectional shape of the preforms is determined by the shape of the hole cross-section.

BRIEF DESCRIPTION OF THE DRAWING

FIG. 1 is a schematic representation of a breaker mill that may be used in the process of the present invention. The reference characters of FIG. 1 are summarized as follows: (1) represents the drive shaft; (2) represents a breaker; (3) represents the die with holes; (4) represents the shearing-off apparatus; (5) represents the housing; d represents the bore diameter; I represents the bore length; $D_K$ represents the breaker diameter; B represents the breaker width; and $D_M$ represents the die diameter.

DETAILED DESCRIPTION OF THE INVENTION

It should be emphasised that if defined process parameters are maintained there is hardly any drying-out of the nitrocellulose which is used, and thus the latter does not fall within the explosive substance range of less than 25% moisture.

At least one breaker rotates in the breaker mill. Two breakers are customary, although more than 2 breakers can be provided. This depends on the size of the processing unit and on the diameter of the breakers. The compacted material which is obtained can vary from hard (with sharp edges) to soft (easily crushed with the fingers).

It is also possible, however, for the moistened nitrocellulose simply to be pressed through the die and thus to be compacted by a reciprocating movement of a wheel on a die which is provided with holes.

When the die contains circular holes, the pressing ratio P determines the consistency of the compacted nitrocellulose. P is defined as the ratio of the length of the bore to the diameter of the bore in the die:

$$P = \frac{\text{length of bore}}{\text{diameter of bore}}.$$

The pressing ratio P should range between 0.5–5.0, preferably between 0.5 and 3.0.

It is also possible for the holes in the die to have a square, rectangular, oval or irregularly shaped cross-section. The number of holes per unit area of the die depends on the stability of the die. By means of compaction, it is possible to increase the apparent density of the nitrocellulose used by a multiple and thereby to obtain free-flowing material.

The uncompacted material is fed into the breaker mill via a metering device (such as a continuous screw or belt for example). It is also possible to provide the breaker mill with an inert atmosphere, e.g. nitrogen or carbon dioxide. The following examples describe the process in greater detail, but do not limit it.

EXAMPLE 1

Nitrocellulose corresponding to Standard A 30, moistened with 34.6% ethanol, was continuously fed at 210 kg/h into the breaker mill (die diameter: $D_M$=175 mm, breaker diameter: $D_K$=130 mm, breaker width: B=27 mm, number of breakers: 2, drive shaft speed=150 rpm). The pressing ratio was 2 (hole diameter: d=6 mm, hole shape: circular, length of bore: l=12 mm). The distance from the shearing apparatus to the underside of the die was 20 mm. The compacted material had a moisture content of 34.2% and an apparent density of 578 g/l. The preforms remained free-flowing in a 100 litre drum even after being stored therein for eight weeks.

EXAMPLES 2–7

These examples were carried out as described for Example 1. The test parameters are given in Table 1.

What is claimed is:

1. A process for producing compacted free-flowing fibrous lacquer raw materials based on nitrocellulose comprising:
   moistening fibrous lacquer raw material with a solvent selected from the group consisting of water and alcohol; and
   pressing the moistened fibrous lacquer raw material through a die having a plurality of holes.

2. The process of claim 1 wherein said process is carried out at a pressing ratio, P, as represented by the following formula, P=(length of bore)÷(diameter of bore) of from 0.5–5.0.

3. The process of claim 2 wherein said pressing ratio P is from 0.5 to 3.0.

4. The process of claim 1 wherein the lacquer raw material is pressed through the die holes by means of one or more circulating breakers.

5. The process of claim 1 wherein the lacquer raw material is pressed through the die holes by means of one or more oscillating wheels.

6. The process of claim 1 further comprising shearing off the compacted lacquer raw material, below the die, into pieces of selected length.

7. The process of claim 1 wherein the lacquer raw material has a nitrogen content $\leq 12.6\%$.

8. A compacted free-flowing fibrous lacquer raw material based on nitrocellulose prepared by the process of claim 1.

9. The process of claim 1 wherein the compacted free-flowing lacquer raw material has a moisture content of at least 25%.

* * * * *

| | | | Moisture content | | Throughput | Apparent density | | Die | | | |
|---|---|---|---|---|---|---|---|---|---|---|---|
| Example | NC Standard | Moistening agent | before (%) | after (%) | moist NC (kg/hour) | before (g/l) | after (g/l) | D (mm) | L (mm) | P | Drive shaft speed (rpm) |
| 1 | A 30 | ethanol | 34.6 | 34.2 | 210 | 383 | 578 | 6 | 12 | 2 | 150 |
| 2 | E 27 | ethanol | 32.4 | 31.5 | 116 | 253 | 565 | 6 | 12 | 2 | 150 |
| 3 | E 22 | ethanol | 32.0 | 31.7 | 130 | 196 | 556 | 10 | 20 | 2 | 150 |
| 4 | E 34 | ethanol | 34.1 | 31.9 | 332 | 438 | 602 | 10 | 20 | 2 | 150 |
| 5 | E 24 | isopropanol | 35.2 | 35.0 | 190 | 191 | 556 | 8 | 16 | 2 | 150 |
| 6 | A 27 | ethanol | 30.9 | 30.4 | 133 | 380 | 539 | 6 | 6 | 1 | 150 |
| 7 | E 22 | ethanol | 32.8 | 31.7 | 57 | 196 | 526 | 6 | 6 | 1 | 201 |

UNITED STATES PATENT AND TRADEMARK OFFICE
CERTIFICATE OF CORRECTION

PATENT NO. : 6,896,752 B1
DATED : May 24, 2005
INVENTOR(S) : Lutz Hoppe et al.

It is certified that error appears in the above-identified patent and that said Letters Patent is hereby corrected as shown below:

Column 4,
Line 12, correct the formula to read:
-- P = (length of bore) ÷ (diameter of bore) --

Signed and Sealed this

Ninth Day of August, 2005

JON W. DUDAS
*Director of the United States Patent and Trademark Office*